US006755076B1

(12) United States Patent
Schmidt et al.

(10) Patent No.: US 6,755,076 B1
(45) Date of Patent: Jun. 29, 2004

(54) DEVICE FOR INSTANTANEOUS AD HOC ANALYSIS OF AN INJECTION FLOW PROVIDED BY AN INJECTION SYSTEM USED IN A HEAT ENGINE

(75) Inventors: Francois Schmidt, Millery (FR); Pierre Eynard, Marcy l'Etoile (FR); Bernard Maurin, Oullins (FR); Christian Gauthier, Lentilly (FR)

(73) Assignee: EFS SA, Montagny (FR)

( * ) Notice: Subject to any disclaimer, the term of this patent is extended or adjusted under 35 U.S.C. 154(b) by 0 days.

(21) Appl. No.: 09/980,393

(22) PCT Filed: Jun. 15, 2000

(86) PCT No.: PCT/FR00/01660

§ 371 (c)(1), (2), (4) Date: Feb. 27, 2002

(87) PCT Pub. No.: WO00/79125

PCT Pub. Date: Dec. 28, 2000

(30) Foreign Application Priority Data

Jun. 18, 1999 (FR) ........................................... 99 07982

(51) Int. Cl.[7] ............................................ G01M 15/00
(52) U.S. Cl. ........................................................ 73/116
(58) Field of Search ........................ 73/119 A; 123/679, 123/687, 673, 480, 447, 701, 450, 453, 365; 60/276; 417/53; 435/287.2

(56) References Cited

U.S. PATENT DOCUMENTS

| | | | | | |
|---|---|---|---|---|---|
| 3,577,967 | A | * | 5/1971 | Staudt | 123/365 |
| 3,739,758 | A | * | 6/1973 | Knapp et al. | 123/453 |
| 4,040,405 | A | * | 8/1977 | Tanaka et al. | 123/139 BG |
| 4,488,526 | A | * | 12/1984 | Takahashi | 123/357 |
| 4,572,136 | A | * | 2/1986 | Takeuchi et al. | 123/447 |
| 5,724,951 | A | * | 3/1998 | Mukumoto | 123/687 |
| 6,135,100 | A | * | 10/2000 | Katoh | 123/679 |

FOREIGN PATENT DOCUMENTS

| | | | |
|---|---|---|---|
| DE | 41 30 394 | A | 3/1992 |
| DE | 197 00 304 | C | 3/1992 |
| GB | 2 293 626 | A | 4/1996 |

* cited by examiner

*Primary Examiner*—Edward Lefkowitz
*Assistant Examiner*—Octavia Davis
(74) *Attorney, Agent, or Firm*—Oliff & Berridge, PLC

(57) ABSTRACT

The measuring device includes a first measuring chamber (8) into which fuel is injected, pressure sensor (62) and a temperature sensor (60) respectively measuring pressure and temperature in the first measuring chamber (8), devices enabling the measuring chamber to be at least partially drained, an electronic section controlling the system and analyzing information received from the sensors (46, 60, 62). The device also includes a second measuring chamber (20) arranged downstream from the first measuring chamber (8). Fuel which is drained from the first measuring chamber (8) is sent to said second chamber. The volume of the second measuring chamber (20) can vary according to the displacement of a piston (38). The displacement is measured with the aid of a displacement sensor (46).

11 Claims, 1 Drawing Sheet

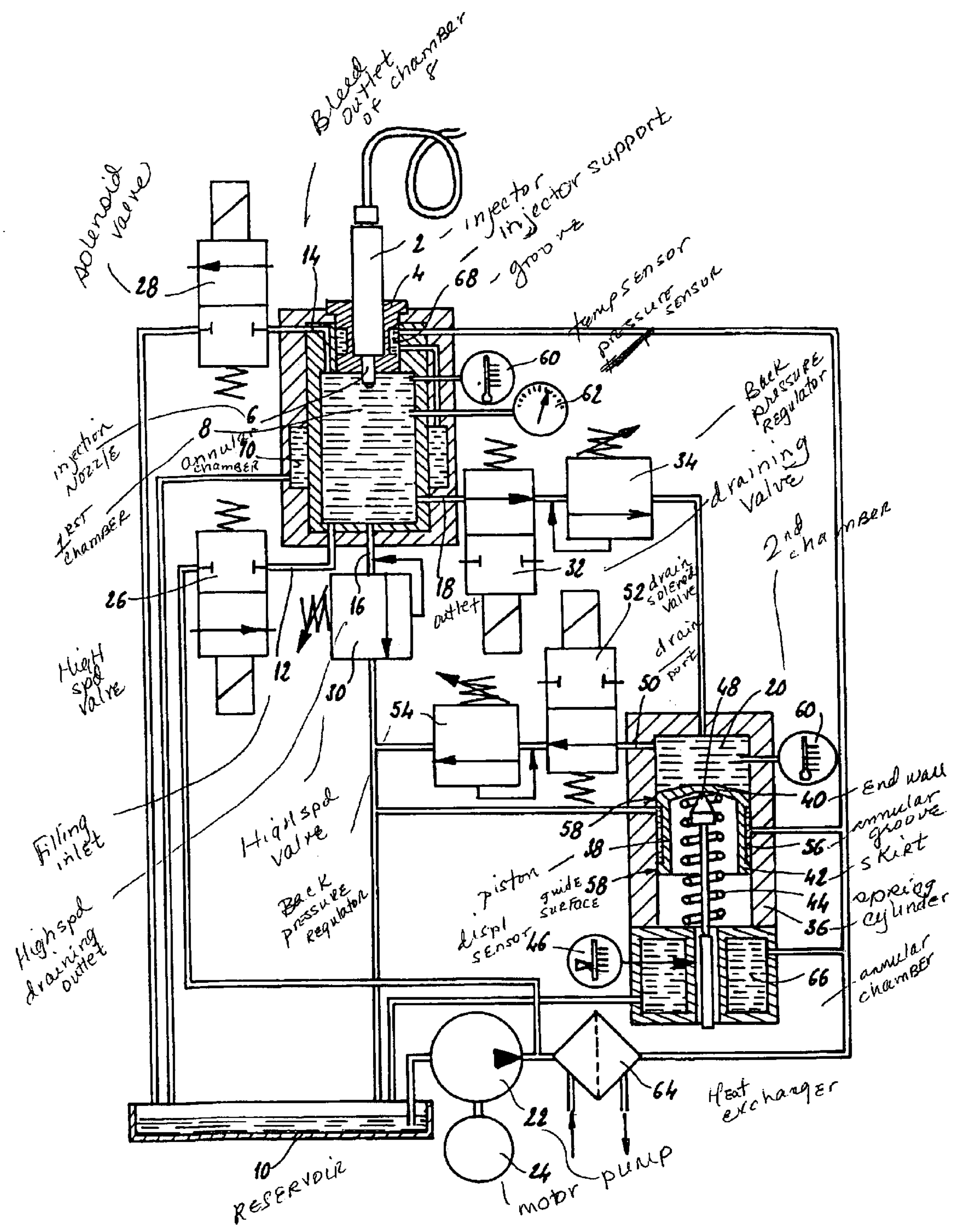
Bleed outlet of chamber 8
solenoid valve
28
14
2 - injector
injector support
4
68 - groove
temp sensor
pressure sensor
60
62
Back pressure regulator
34
draining valve
6
injection nozzle
8
1st chamber
10
annular chamber
26
High spd valve
12
16
30
18
outlet
32
52
drain solenoid valve
drain port
50
48
20
2nd chamber
54
60
40
End wall
56
annular groove
42
skirt
38
piston
58
guide surface
44
spring
36
cylinder
46
displ sensor
66
annular chamber
Filling inlet
High spd valve
Back pressure regulator
High spd draining outlet
22
pump
24
motor
64
Heat exchanger
10
RESERVOIR

DEVICE FOR INSTANTANEOUS AD HOC ANALYSIS OF AN INJECTION FLOW PROVIDED BY AN INJECTION SYSTEM USED IN A HEAT ENGINE

The present invention relates to a device for instantaneously analyzing the shot by shot injection delivery supplied by an injection system used in a combustion engine. The injection systems concerned are, with equal preference, those found in vehicles equipped with a diesel engine, a gasoline engine, or an engine operating on LPG (liquefied petroleum gas), or any other type of engine.

Injection systems typically comprise one or more injection pumps whose task is to place the fuel under a pressure which currently may range from 100 to 2500 bar, one or more pressurized fuel reservoirs, one, or perhaps more, injectors per cylinder of the engine to be supplied, and a control system, increasingly often electronic, whose task is to control the value of the masses or volumes of fuel injected to suit the conditions of the engine surroundings, the characteristics of the fuel, and engine running requirements.

Current trends in injection systems are toward increasing the pressure of the fuel and the precision with which the injected quantities are controlled. Attempts are being made at optimizing any parameter which makes it possible to improve the efficiency of the engine and reduce the impact that the operation thereof has on the environment, particularly in the form of gaseous and acoustic pollution.

Measuring devices have been designed to allow the manufacturers of injection systems and of combustion engines to develop injectors and make settings and checks on conformity during manufacture and during installation for end-use.

The known measuring devices are used in conjunction with a special-purpose test rig, the role of which is essentially to turn an injection pump and secure the various elements of the injection system under test. These devices cannot be used on a fuel-injected combustion engine in nominal operation. The measurements are often made using a fluid which differs from the fuel for the injection of which the injection system was designed. That fluid is chosen to exhibit hydraulic properties similar to those of the fuel but with a higher flash point so as to minimize risks of fire and explosion. Thus, in what follows, the term fuel will be used also to denote the fluid used for carrying out delivery measurements.

The measuring apparatus includes a mechanical section and an electronic section. The mechanical section includes a securing system to hold one or more injectors, one measurement cell per injector for producing an electric image of the amount of fluid injected and a system for removing fluid.

The electronic section is generally in the form of a cabinet equipped with various means for interfacing with the operator, such as a screen and a keyboard, and with other external processing systems. The electronic section processes an electrical signal supplied by the mechanical section, controls and drives various auxiliaries concurrent with the measurement process.

The basic technique used for producing such measurement apparatus relies on measuring the displacement of a piston sliding in a liner, the assembly delimiting a deformable measuring volume into which the injected fuel is directed. Any quantity of fuel added to this volume causes a displacement of the piston which can easily be converted into an electrical signal by use of one of the numerous types of sensor available for this purpose. This provides a volumetric measurement. The conversion into a mass measurement is done by calculation, using the value of the density of the fuel. To guarantee precise calculation, the temperature of the fuel is measured in the measuring volume.

Other methods are used to obtain information of the temporal type, when reference is made to a time scale, or of angular type, when reference is made to a scale associated with the rotation of the driveshaft. There are two methods which are predominantly used. They are based on measuring a variation in instantaneous pressure and are carried out in measuring apparatuses of geometric structure different than those employing a piston. The "Bosch" method uses a long wound tube and the "Zuech" method uses a volume of a few hundred $mm^3$. These methods make it possible to determine at what precise instant fuel is injected, but they give poor precision as to the amplitude of the fuel delivery. These methods therefore do not make it possible to determine precisely the quantity of fuel injected.

The known measuring devices therefore make it possible either to determine precisely the quantity of fuel injected by an injector or to determine the appearance of the curve of the delivery as a function of time. There does not yet exist any measuring apparatus that makes it possible to determine both the precise values of the injected volumes and the injection times/angles.

It is therefore an object of the present invention to provide such a measuring apparatus which therefore makes it possible to perform both these two different measurements.

To this end, the device that the present invention proposes is a device for measuring a quantity of fuel injected by an injector used in a combustion engine comprising a first measuring chamber into which the fuel is injected, a pressure sensor and a temperature sensor respectively measuring the pressure and the temperature in the first measuring chamber and means allowing this measuring chamber to be drained at least partially, an electronic section controlling the system and analyzing information received through the sensors.

According to the invention, this device comprises, downstream of the first measuring chamber, a second measuring chamber into which the fuel drained from the first measuring chamber is sent, and the volume of the second measuring chamber can vary with the displacement of a piston, the displacement of which is measured using a displacement sensor.

In this way, there is obtained a device which makes it possible to determine the delivery of fluid as a function of time and the precise quantity of fluid injected. The way in which this device works is then, for example, the way described in the paragraph below.

When the device is ready to make a measurement, that is to say when there is fluid in the first and second measuring chambers and a predetermined reference pressure has become established in the first measuring chamber, an injection is performed. This causes an increase in pressure in the first measuring chamber, the increase being associated with the quantity of fluid injected, with the characteristics of the fluid, with the environmental conditions, particularly the temperature, the initial pressure and the volume of the chamber. At the end of injection, the fluid which has been injected is drained into the second measuring chamber. The pressure in the first measuring chamber is thus returned to its initial value and this first chamber is ready to receive a second injection. The fluid which arrives in the second measuring chamber causes the volume of this chamber to increase, pushing the piston. This displacement is measured and, knowing the diameter of the piston, part of the electronic section calculates the exact volume of fluid. This measurement allows the electronic section to calibrate, at any moment, very exactly, the measurements made by the first measuring chamber.

The first measuring chamber therefore makes it possible to provide, with precision, the "shape" of the injection, while the second makes it possible to measure the quantity of fuel injected. The processing performed by the electronic section makes it possible to compensate for the defects of each of the measurements using the qualities of the other. The mechanical design of the device is more robust than the devices of the state of the art. It is not, in particular, necessary to use a pressure equalizing device in the second measuring chamber. The back-pressure is provided directly by the pressure of injection into the first cell, altering its draining. The piston can therefore simply be returned by a spring. As the stresses in the second measuring chamber are appreciably lower than in a chamber of the same type in the prior art, this chamber has far better resistance and wears far less quickly.

In one advantageous embodiment of the measuring device, a high-speed solenoid valve controlled by part of the electronic section, and a back-pressure regulator are arranged between the two measuring chambers for partially draining the first measuring chamber after an injection until the pressure in the first measuring chamber returns to the pressure that was in this chamber prior to this injection.

In this case, the electronic section advantageously comprises a compensating device to make it possible to take account of any pressure difference there might be in the first measuring chamber after two successive drainings.

In order to be able to drain the second measuring chamber after each displacement of the piston, and thus make measurements always starting from more or less the same initial piston position, a high-speed draining solenoid valve is advantageously provided downstream of the second measuring chamber.

As already mentioned above, the piston may be preloaded, for example by a spring, urging it toward the second measuring chamber.

In one advantageous embodiment, the piston moves in a smooth-walled cylinder and comprises an annular groove open toward the wall of the cylinder. This groove makes it possible to trap any leaks of gas or fluid there might be, preventing these leaks from disturbing the measurement. It also makes it possible to make the piston lighter. It also makes it possible to limit the area of the piston that needs to be lapped and matched. Finally, it increases the flexibility of the piston, which allows its sliding in the cylinder to be less impeded.

The piston displacement sensor used is, for example, an inductive sensor, but any other type of sensor may be used here. It is possible, for example, also to use an optical sensor, of interferometric type. Such a sensor is more precise, linear, and adds no moving mass to the mass of the piston. By contrast, its cost is higher and it is trickier to operate.

The measuring device according to the invention may advantageously comprise a cooling system for cooling the injector, the first measuring chamber, the piston and the piston displacement sensor. Thus, the temperature in the measuring device is evened out and its variations are limited, which makes it possible to increase the precision of the measurements taken. Use is then advantageously made, in the cooling system, of the same fluid as the one used for performing the injections.

In any event, the invention will be clearly understood with the aid of the description which follows, with reference to the single appended FIGURE which depicts, by way of non-limiting example, one embodiment of measuring apparatus according to the invention.

The single FIGURE very schematically shows the mechanical part of an apparatus for measuring the quantity of fuel injected by an injector according to the invention.

The single FIGURE depicts an injector 2 mounted on an injector support 4. This injector 2 comprises an injection nozzle 6 which lies in a first measuring chamber 8. This measuring chamber is a constant-volume chamber. It is filled with a fluid which has hydraulic characteristics similar to those of a fuel but with a far higher flash point than a fuel so as to minimize the risks of fire and explosion. This fluid is also the fluid used in the injector 2. A reservoir 10 of this fluid is provided in the device depicted in the drawing.

The first measuring chamber 8 has several inlets and several outlets. It has first of all a filling inlet 12, a bleed outlet 14, a high-speed draining outlet 16, and an outlet 18 to a second measuring chamber 20.

To fill the first measuring chamber 8, fluid is pumped from the reservoir 10 using a pump 22 driven by a motor 24. A high-speed filling solenoid valve 26 is mounted between the pump 22 and the filling inlet 12 so as to control the filling of the first measuring chamber 8. A solenoid valve 28 is also provided at the bleed outlet 14. To drain the chamber 8, a high-speed draining solenoid valve 30 is provided. It may be pointed out here the high-speed draining outlet 16 is advantageously situated at a low point of the first measuring chamber 8, while the bleed outlet 14 is placed at a high point of this chamber 8.

Arranged between the first measuring chamber 8 and the second measuring chamber 20 are a draining solenoid valve 32 and an adjustable back pressure regulator 34.

The second measuring chamber 20 has a variable volume. It is produced in a cylinder 36 in which a piston 38 moves. This piston 38 has an end wall 40 and a skirt 42. The end wall 42 is domed and forms a wall closing the measuring chamber 20. To keep the piston 38 balanced, a spring 44 rests against the end wall 40, on the opposite side to the measuring chamber 20. It is just as possible to have a piston with a domed end wall, convex or concave, as it is a piston with a flat end wall.

The displacement of the measurement piston 38 is supplied by a displacement sensor 46, engaging at a point of contact 48 with the opposite face of the end wall 40 to the measuring chamber 20. This displacement sensor 46 is, for example, an inductive sensor.

The second measuring chamber 20 also comprises a drain port 50, the opening and closure of which are controlled by a draining solenoid valve 52 associated with a back-pressure regulator 54. The drained fluid returns to the reservoir 10. The wall of the cylinder 36 along which the piston 38 travels is a smooth wall. This cylinder may or may not be lined. The skirt 42 on its exterior face has an annular groove 56. This groove extends over roughly half the height of the piston 38 and is centered with respect to the height thereof. This then forms two annular guide surfaces 58.

The mechanical device described hereinabove is associated with an electronic device, not depicted here, and which receives information from two temperature sensors 60, each chamber being equipped with a rapid-response temperature sensor 60, and from a pressure sensor 62 located at the first measuring chamber 8.

A cooling system is also provided in the measuring device. The cooling fluid is the same as the fluid injected at the injector 2. Downstream of the pump 22 there is a heat exchanger 64. The same reservoir 10 therefore is used for the fluid injected and for the cooling liquid. This cooling fluid is sent to the injector support 4 and then around the first measuring chamber 8, to the displacement sensor 46 and to the piston 38. An annular chamber 66 surrounds the displacement sensor 46 and comprises a cooling fluid supply duct and a duct for the return of this fluid to the reservoir 10. There is a groove 68 in the injector support 4 to allow the cooling. liquid to flow around this injector support. This groove 36 is supplied with cooling liquid by a pipe and the cooling liquid, having left the groove 36, passes into an annular chamber 70 situated around the first measuring chamber 8, before returning to the reservoir 10.

The annular groove 56 of the piston 38 is also supplied with cooling fluid. A supply port is provided in the cylinder 36 for this purpose. Another port is also provided for returning the cooling fluid to the reservoir 10. This return port is advantageously offset heightwise with respect to the supply port and is preferably above the latter and diametrically opposite it.

The way in which this measuring device works is described below.

The first measuring chamber is first of all filled with fluid pumped from the reservoir 10 using the pump 22 and by opening the solenoid valve 26. Once the chamber has been filled, it is bled using the solenoid valve 28, to guarantee that there are no bubbles of air or other gas within it. To fill the second measuring chamber it is possible, during this filling, to open the solenoid valve 32 to the second measuring chamber 20.

To place the first measuring chamber 20 under pressure, fluid is injected through the injector 2 into the first measuring chamber 8 until a pressure above the reference pressure is obtained. Thanks to the draining solenoid valve 32 and the back-pressure regulator 34, the pressure in the first measuring chamber is returned to the reference pressure. Actual measurement proper can then begin. The injector 2 then injects fluid into the first measuring chamber 8. By virtue of the sensors, particularly the pressure sensor 62, it is thus possible to determine the curve of injected fluid delivery as a function of time. This injection actually causes an increase in the pressure in the first measuring chamber. When the pressure in this chamber is no longer increasing, this fact is used to deduce that injection is finished. The solenoid valve 32 then opens and remains open until the pressure in the first measuring chamber returns more or less to the initial reference pressure. The back-pressure regulator 34 makes it possible to maintain this residual reference pressure in the first measuring chamber 8. The fluid leaving the first measuring chamber 8 is sent into the second measuring chamber 20. The volume of this second measuring chamber 20 therefore increases, and this causes a displacement of the piston 38. The displacement sensor 46 measures this displacement of the piston 38, and by knowing, by virtue of the temperature sensor 60, the temperature of the fluid in the chamber 20, it is possible to determine the quantity of fluid introduced into the second measuring chamber 20.

All the data obtained are then sent to an electronic processing unit. The main data items are the initial pressure in the first measuring chamber, the final pressure in this chamber, and the pressure difference during injection, together with the displacement of the piston 38. Using the "cross matrices" processing method, the results of the measurement are then obtained. These results are already obtained before a second injection. Indeed, during the first injection, the fluid is injected into the first measuring chamber. Then the fluid is transferred to the second measuring chamber 20. A second injection can therefore take place into the first measuring chamber 8. The results are obtained as soon as the transfer from the first measuring chamber 8 to the second measuring chamber 20 is complete, namely just before the second injection.

The second measuring chamber is drained using the solenoid valve 52. The second back-pressure regulator 54 makes it possible to maintain a second reference pressure in the second measuring chamber 20.

The relationship between the increase in pressure and the volume injected in the first chamber 8 is not linear. It depends in particular on the characteristics of the fluid, on the temperature and on the pressure. This pressure varies during the injection, and this phenomenon is used for the measurement. Calibration is performed by injecting small volumes, but in order to keep precision on the measurement, the volumes are not too small, for example 10 $mm^3$ for a measurement scale of 200 $mm^3$. Several injections are made in succession, beginning the injection at different pressures, chosen to cover the entire range of pressures encountered during nominal operation. Each injection is measured precisely by the second chamber 20. A series of points of correspondence between a starting pressure in the chamber, a small variation in pressure due to the injection and the injected volume is obtained, at the nominal temperature of the measurements with the actual test fluid in its current state. The calculation unit periodically stores a table of values making it possible to linearize and correct, in real time, the subsequent measurements. The advantage of this procedure is that it resorts to no external device. Exploration of the various starting pressures is done simply by cumulating several injections without opening the solenoid valve for transfer to the second chamber, which has the effect of gradually increasing the pressure in the first chamber 8 to somewhere close to each desired value for storing a linearization curve. This method of calibration is given by way of example and other methods are conceivable here.

This measuring device makes it possible to obtain with precision the quantity of fuel injected by the injector and also precisely supplies the curve of delivery as a function of time.

An electronic compensating device is provided to take account of any possible imperfection in the phase of draining the first measuring chamber 8 and to provide precise measurement results even if the final pressure in this chamber, after draining, is not strictly equal to the nominal initial pressure. The system is capable of handling relatively significant variations in this parameter. This compensating function is important because, amongst other things, the response times of the solenoid valve on closure and on opening are not absolutely stable or predictable, even though their mean value is taken into consideration by the system in the sequence for controlling this solenoid valve.

The displacement of the piston measured by the displacement sensor 46, for example an inductive sensor, makes it possible, by knowing the exact diameter of the piston, to calculate the volume injected. This measurement allows the electronic section at any moment to very exactly calibrate the measurements made by the first cell. The groove 56 produced in the piston affords several advantages; first of all, it allows any leaks of gas or fluid there might be to be trapped, preventing these from disrupting the measurement; it also allows the piston to be lightened and therefore makes it possible to limit the undesirable effects due to its mechanical inertia; and finally it makes it possible to reduce the area of the piston which needs to be perfectly lapped and matched with the interior surface of the cylinder by limiting this guide surface to two rings situated at the ends of the piston. The piston, particularly in the region of its skirt, has greater flexibility than the pistons used in the devices of the prior art thanks to the thinning of the skirt. All this is achieved without making the piston more difficult to produce and in addition while at the same time making it possible to reduce the stresses that impede the sliding of the piston 38 in the cylinder 36.

Because of the design of this system, there is no need to use pressurized nitrogen to provide a back-pressure on the measurement piston. Any risk of leakage of this gas is thus avoided. In addition, the volume and mass of fuel injected at the injector 2 are measured at a stabilized temperature. This brings reliability and precision to the measurement made.

The processing performed by the electronic section pools the information obtained from the two measuring chambers and makes it possible to compensate for the defects of each using the qualities of the other. The results supplied to the operator or to the connected external data processing systems are completely preprocessed by the electronic section and include all compensations.

The mechanical design of this measuring device is far more robust than in the systems of the prior art. In particular, there is no longer any need to use the pressure equalizing device in the first measuring chamber. This back-pressure is supplied directly by the pressure of injection into this chamber by altering its draining. The second measuring chamber with the piston no longer needs to be particularly "quick" because it is filled by the draining solenoid valve of the first measuring chamber, the operation of which is fully controlled. It no longer needs to operate with a back-pressure, and a simple spring is therefore enough to return it. As the piston operates with lower pressure stresses, the stresses between the piston and its liner are limited, and wear is very significantly reduced.

As goes without saying, the invention is not restricted to the embodiment described hereinabove by way of non-limiting example; on the contrary, it encompasses all alternative forms within the scope of the claims which follow.

What is claimed is:

1. A device for measuring a quantity of fuel injected by an injector (2) used in a combustion engine including;

a first measuring chamber (8) into which the fuel is injected, a pressure sensor (62) respectively measuring the pressure in the first measuring chamber (8), a temperature sensor (60) measuring the temperature in the first measuring chamber (8), downstream of the first chamber (8), a second measuring chamber (20) which is connected to the first chamber (8) by a drain pipe (18) and the volume of which can vary according to the movement of a piston (38), the displacement of which is measured using a displacement sensor (46), means for draining the first measuring chamber (8) at least partially, means for draining the second measuring chamber (20) at least partially, an electronic section analyzing information received through the sensors (46, 60, 62) and controlling the draining means of the first chamber (8) and the second chamber (20) in particular, characterized in that:

the means of draining the first chamber (8) into the second chamber (20) includes a high-speed valve (32), the means of draining the second chamber (20) includes a high-speed valve (52), the electronic section is designed to control the means of draining the first chamber (8) and the second chamber (20) so as, on the one hand, to partially drain the first measuring chamber (8) after each injection until the pressure in the first measuring chamber (8) after each injection until the pressure in the first measuring chamber returns to essentially the pressure that was in this chamber prior to this injection and, on the other hand, to partly drain the second chamber (20) after each measurement of the volume of each injection.

2. The measuring device as claimed in claim 1, characterized in that the electronic section comprises a compensating device to make it possible to take account of any pressure difference there might be in the first measuring chamber (8) after two successive drainings.

3. The measuring device as claimed in claim 1, characterized in that the means of draining the first measuring chamber (8) comprise a back-pressure regulator (34).

4. The measuring device as claimed in claim 1, characterized in that the means of draining the second measuring chamber (20) comprise a back-pressure regulator (54) intended to keep the pressure in the second chamber at a reference value.

5. The measuring device as claimed in claim 1, characterized in that the piston (38) is preloaded by a spring (44) urging it toward the second measuring chamber (20).

6. The measuring device as claimed in claim 1, characterized in that the piston (38) moves in a smooth-walled cylinder (36) and in that it comprises an annular groove (56) open toward the wall of the cylinder (36).

7. The measuring device as claimed in claim 1, characterized in that it includes a cooling system for cooling the injector (2), the first measuring chamber (8), the piston (38) and the piston displacement sensor (46).

8. The measuring device as claimed in claim 7, characterized in that the fluid used in the cooling system is the same as the fluid used for performing the injections.

9. A method for measuring characteristics of an injection of fuel performed by an injector of the type consisting in using a first chamber for measuring the pressure and the temperature of injection and a second chamber for measuring the volume of fuel injected, characterized in that it further consists, in particular, for each injection;

in measuring the pressure and the temperature in the first chamber prior to the injection, in injecting fuel into the fuel chamber using the injector, changing a volume of the second chamber as the drained fuel enters the second chamber, during injection, measuring, at least regularly, the pressure and the temperature in the first chamber, at the end of injection, draining some of the fuel contained in the first chamber into the second chamber until the pressure in the first chamber returns roughly to the pre-injection pressure, maintaining a constant volume of the first chamber prior to, during and after injection, measuring the volume of the drained fuel and from it deducing the volume of the injection, draining some of the fuel contained in the second chamber.

10. The measuring method as claimed in claim 9, characterized in that it consists in correcting the values relating to each injection using, in particular, prerecorded calibration.

11. The measuring method as claimed in claim 9, characterized in that it consists, when draining the second chamber, in performing this draining until a reference pressure is established in that chamber.

* * * * *